Figure 1:
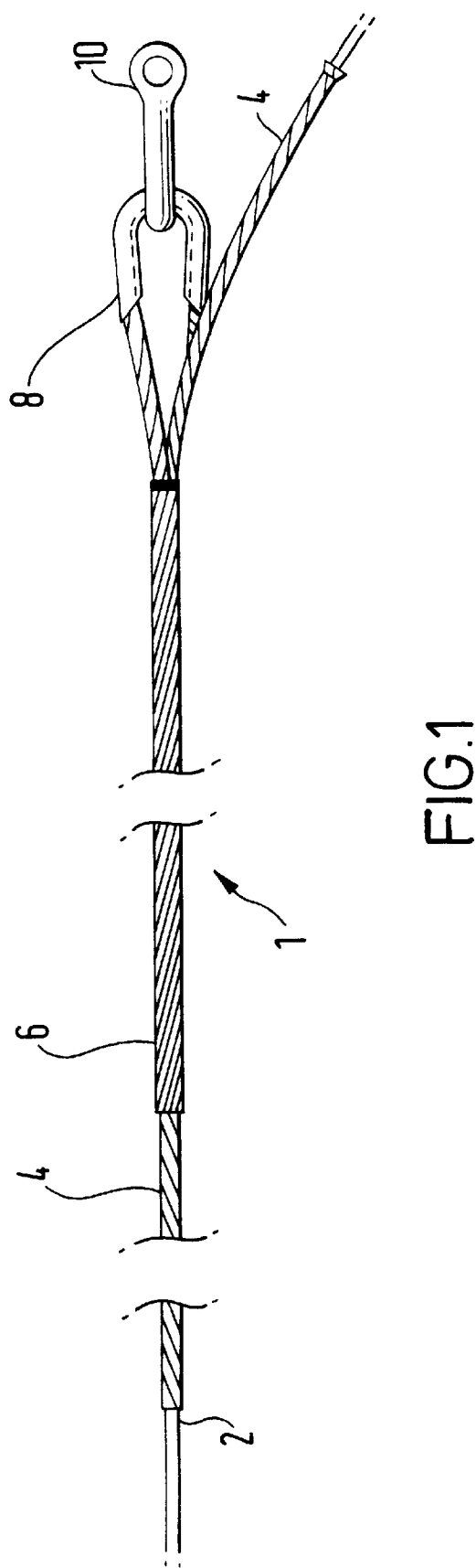

United States Patent [19]
Sutehall et al.

[11] Patent Number: 6,085,008
[45] Date of Patent: Jul. 4, 2000

[54] AERIAL CABLE AND TENSION CLAMP ASSEMBLY

[75] Inventors: Ralph Sutehall; Sam Armitage; Martin Vincent Davies, all of Gwent, United Kingdom

[73] Assignee: Pirelli General plc, London, United Kingdom

[21] Appl. No.: 09/097,151

[22] Filed: Jun. 12, 1998

[30] Foreign Application Priority Data

Jun. 13, 1997 [GB] United Kingdom ............... 9712429

[51] Int. Cl.$^7$ ............................................ H02G 7/10
[52] U.S. Cl. .................. 385/100; 385/101; 174/40 TD; 174/41; 174/45 TD
[58] Field of Search ............... 174/40 TD, 41, 174/45 TD, 40 CC; 385/100, 101, 136, 139

[56] References Cited

U.S. PATENT DOCUMENTS

| | | | |
|---|---|---|---|
| 3,932,697 | 1/1976 | Hood | 174/79 |
| 4,770,491 | 9/1988 | Champ et al. | 350/96.23 |
| 5,758,005 | 5/1998 | Yoshida | 385/136 |

FOREIGN PATENT DOCUMENTS 33 38 190  5/1985  Germany .

*Primary Examiner*—Cassandra Spyrou
*Assistant Examiner*—Leo Boutsikaris
*Attorney, Agent, or Firm*—Finnegan, Henderson, Farabow, Garrett & Dunner, L.L.P.

[57] ABSTRACT

An assembly comprising a self supporting aerial cable and tension clamp means including gripping means for gripping the cable, the gripping means comprising at least one helically wound rod fitted over the cable's outer sheath, wherein $$\frac{(C+R)-(W_R-R)}{C+R} > 0.15,$$

where C is the outer diameter of the cable, R is the diameter of the or each rod and $W_R$ is the outer diameter of the unstressed winding of the or each rod.

8 Claims, 2 Drawing Sheets

AERIAL CABLE AND TENSION CLAMP ASSEMBLY

The invention relates to an aerial cable and tension clamp assembly.

Tension clamps are known for supporting all dielectric self-supporting (ADSS) cables along overhead routes. Such cables may comprise a glass reinforced plastics central strength member providing a relatively rigid and crush resistant cable structure. More recently developed ADSS cables comprise a loose tube for containing optical fibres, the tube being surrounded by a layer of aramid fibres surrounded by a relatively hard plastics outer sheath. These fibres may be impregnated with hot melt adhesive which bonds the fibres together. Alternatively, the fibres may be more tightly packed and not bonded together with hot melt adhesive. The latter type of cable will henceforth be described as an unimpregnated aramid fibre cable and is particularly suited to use in hot climates, where operating temperatures may reach 70° C. at the cable core.

One type of known tension clamp comprises an assembly of reinforcing rods (which typically are steel rods) each preformed in a helix for fitting over a particular size and type of cable to produce a predetermined compressive force for gripping the cable. The amount of compression is conventionally indicated by $$\frac{(C+R)-(W_R-R)}{C+R},$$

where C is the outer diameter of the cable, R is the diameter of each reinforcing rod and $W_R$ is the outer diameter of the winding of the reinforcing rods in an unstressed (unfitted) condition. The reinforcing rods compression is commonly less than 0.15 (or 15%). The known tension clamps also comprise a so-called 'dead end' which is an assembly of rods (again typically steel rods) fitted over the reinforcing rod assembly intermediate its ends in a double helix and attached to a tension point for supporting the cable tension clamp assembly. The rods of the reinforcing rod assembly and the dead end may be coated with, for example, course sand particles for facilitating frictional engagement therebetween. The compression exerted by the dead end on the reinforcing rods when the clamp and cable are not in tension is conventionally expressed as $$\frac{(C+2R+D)-(W_D-D)}{C+2R+D}$$

where D is the diameter of each dead end rod, $W_D$ is the outer diameter of the winding of the rods of the dead end in an unstressed (unfitted) condition and C and R are as before. The dead end rods compression is commonly less than 0.15 (or 15%).

As tension loading is applied to the cable the dead end tightens up, increasing the compressive force gripping the reinforcing rods.

Known methods of cable clamp design use the increasing compressive force of the dead end for increasing grip on a cable as the tension load increases. The function of the reinforcing rods is to transmit the gripping force of the dead end to the cable and to spread the load along a predetermined length of cable to prevent excessive localized forces on the cable. Thus, if a greater compressive force is required for increasing grip on the cable, the skilled man designing a tension clamp assembly for this purpose would increase the compressive strength of the dead end, and not that of the reinforcing rods. In this connection, reinforcing rod assemblies are often used at suspension only (non-tension) points in an overhead cable installation, where compressive strength for firmly gripping the cable for resisting tensile forces is not required.

A problem has arisen, particularly in connection with tension clamping of the above-mentioned aramid fibre containing cable constructions having relatively hard plastics outer sheaths, whereby increased grip on the cable is required to mitigate relative movement of the cable outer sheath and internal elements of the cable.

An object of the present invention is to provide an aerial cable and tension clamp assembly which mitigates or prevents the effects of the above-mentioned problem.

Accordingly, the invention provides an assembly comprising a self supporting aerial cable and tension clamp means including gripping means for gripping the cable, the gripping means comprising at least one helically wound rod fitted over the cable's outer sheath, wherein $$\frac{(C+R)-(W_R-R)}{C+R} > 0.15,$$

where C is the outer diameter of the cable, R is the diameter of the or each rod and $W_R$ is the outer diameter of the unstressed winding of the or each rod.

Preferably, $$0.3 > \frac{(C+R)-(W_R-R)}{C+R} > 0.2$$

Preferably, $$\frac{(C+R)-(W_R-R)}{C+R}$$

is substantially 0.25.

The cable may comprise a tube for receiving optical fibres, the tube being surrounded by a layer of aramid fibres unimpregnated with hot melt adhesive.

Preferably, the assembly further comprises dead end means, the dead end means comprises at least one helically wound rod and is fitted over a portion of the gripping means, and $$\frac{(C+R)-(W_R-R)}{C+R} \geq 1.5\frac{(C+2R+D)-(W_D-D)}{C+2R+D}$$

where D is the diameter of the or each rod of the dead end means and $W_D$ is the outer diameter of the unstressed winding of the or each rod of the dead end means.

Preferably, $$\frac{(C+R)-(W_R-R)}{C+R} \geq 2\frac{(C+2R+D)-(W_D-D)}{C+2R+D}$$

Preferably, $$\frac{(C+R)-(W_R-R)}{C+R} = 0.25$$

and $$\frac{(C+2R+D)-(W_D-D)}{C+2R+D} = 0.075$$

The dead end means may comprise at least one said rod wound in a double helix and looped over part of a support assembly.

Figure 2:
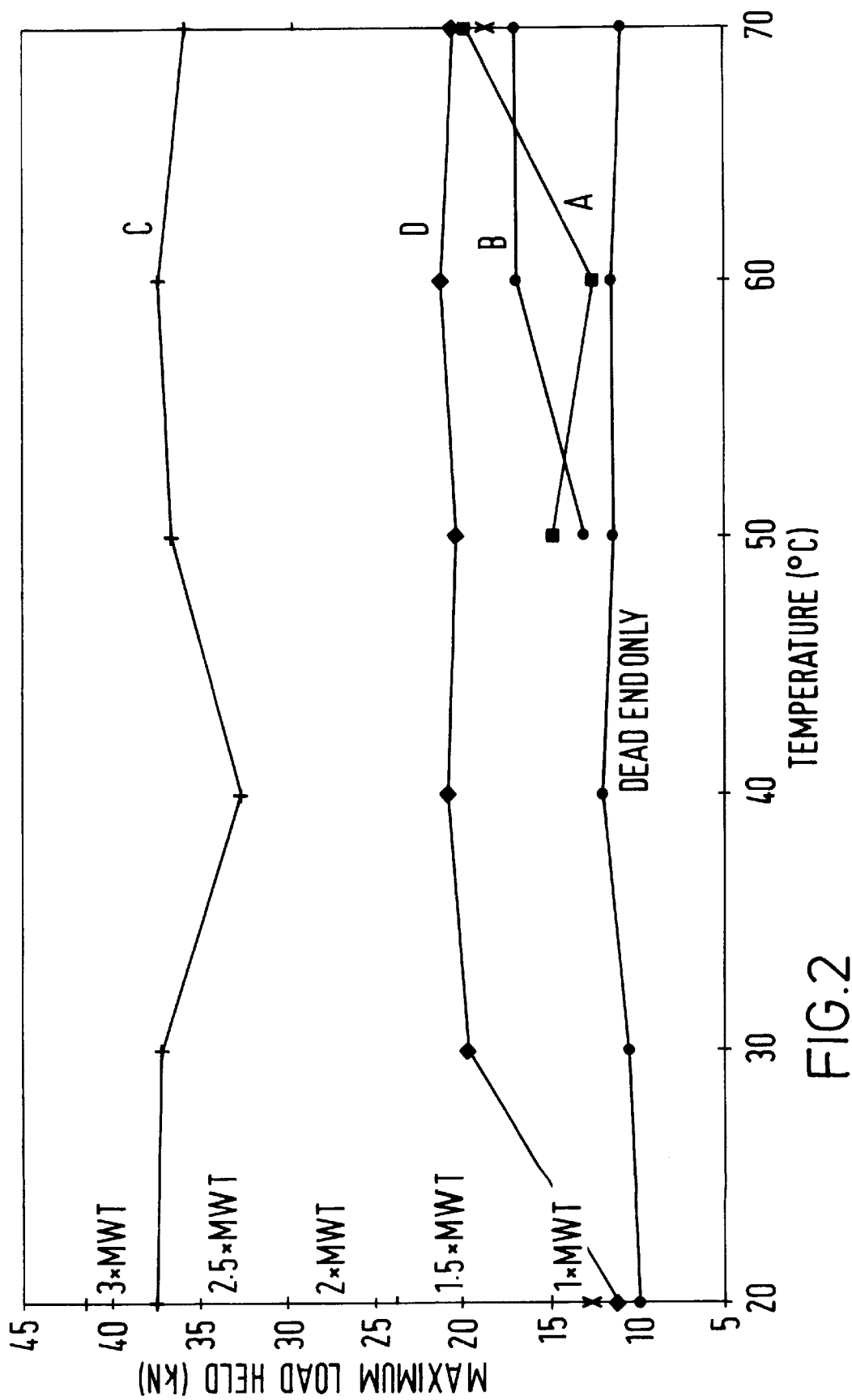

In order that the invention may be better understood, an embodiment thereof, which is given by way of example only, will now be described with reference to the accompanying drawings, in which:

FIG. 1 shows an assembly comprising a cable and tension clamp means fitted to the cable; and FIG. 2 is a graph relating to the results of tensile tests for long span cables and showing the maximum tension load in cables supported by various tension clamp systems against variations in operating temperature.

Referring to FIG. 1, the illustrated assembly 1 comprises an ADSS cable 2 of the type comprising a loose tube surrounded by unimpregnated aramid fibres, gripping means 4 comprising an assembly of steel rods preformed in a helix and fitted over the cable 2 for gripping the cable 2, and dead end means 6 comprising an assembly of steel rods wound in a double helix and fitted over the gripping means 4 intermediate the ends thereof for supporting the gripping means 4. The dead end means 6 is looped over a U-shaped runner 8 attached to a shackle 10 connected to a tension point of an overhead cable support structure. The portion of the dead end means 6 which is fitted over the gripping means 4 is shorter axially than the gripping means 4.

In the assembly 1 shown in FIG. 1, the cable outer sheath has an outer diameter C when not subject to compressive stresses and the rod assembly of the gripping means 4 has a winding outer diameter $W_R$ when in the unstressed condition and a rod diameter R. The gripping means 4 grips the cable 1 with a compressive force approximately dependent on the compression, $$\frac{(C+R)-(W_R-R)}{C+R}$$

The compression of the gripping means 4 is 0.25 (or 25%). The rod assembly of the dead end means 6 has a winding outer diameter $W_D$ in the unstressed condition thereof and a rod diameter D. The dead end means 6 exerts a compressive force on the gripping means 4 approximately dependent on the compression, $$\frac{(C+2R+D)-(W_D-D)}{C+2R+D}$$

The compression of the gripping means 4 is 0.075 (or 7.5%). The dead end means 6 has primarily a supporting function in that it connects the gripping means 4 to the runner 8 at the tension point; whilst the gripping means 4 provides an increased (in comparison with known cable tension clamp assemblies) gripping force which is strong enough to hold the relatively hard cable outer sheath and compress the aramid fibres to prevent substantial relative movement between the outer sheath and the internal elements of the cable 1.

This assembly 1 provides greatly improved performance over conventional assemblies wherein, as described above, the compression of the dead end is conventionally increased if increased grip on the cable is required, in accordance with conventional design rules.

FIG. 2 shows the performance (maximum load held) of an assembly, shown by line C, in tests for a range of operating temperatures. This assembly is similar to the assembly 1 but has a gripping means compression of 0.25 (or 25%) and a dead end compression of 0.15 (or 15%). Lines A, B and D show the comparable results of tests carried out on assemblies having 0.15 (15%) reinforcing rod compression but dead end compressions of 0.20 (20%), 0.15 (15%) and 0.09 (9%) respectively. The maximum load held is also shown in terms of multiples of the maximum working tension (MWT) the cable is likely to experience when subjected to environmental conditions such as ice and wind loading. The cables used in these tests were of the unimpregnated aramid fibre type.

These results are surprisingly good for the assembly of line C in view of the previous bias in the art towards increasing the dead end compression to increase grip on the cable and against adjusting the reinforcing rod compression. In particular, it can be seen that a maximum load of 3×MWT can be maintained even in the temperature range 50° C. to 70° C.

The assembly 1 is advantageous also in that widely available components can be used in its construction to obtain the increased performance.

Whilst the assembly 1 can be used with particular advantage for supporting ADSS cables having unimpregnated aramid fibre construction, it can also be used for supporting other types of cable.

To maximise the effects of the invention it is preferable that gripping means 4 has a compression of at least 1.5 times the compression of the dead end means 6, that is to say $$\frac{(C+R)-(W_R-R)}{C+R} \geq 1.5 \frac{(C+2R+D)-(W_D-D)}{C+2R+D}$$

More preferably, $$\frac{(C+R)-(W_R-R)}{C+R} \geq 2 \frac{(C+2R+D)-(W_D-D)}{C+2R+D}$$

In the embodiment described above, the gripping means compression is four times that of the dead end means. This, of course, is contrary to the accepted design rules, whereby the compression of the dead end means should be equal to the compression of the reinforcing rods (cf the 0.15:0.15 compression relationship mentioned earlier in relation to known tension clamps) or the compression of the dead end means should be increased in relation to the compression of the reinforcing rods.

What is claimed is:

1. An assembly comprising a self supporting aerial cable, having an outer sheath, and tension clamp means including gripping means for gripping the cable, the gripping means comprising at least one helically wound rod fitted over the cable's outer sheath, wherein $$\frac{(C+R)-(W_R-R)}{C+R} > 0.15,$$

where C is the outer diameter of the cable, R is the diameter of the at least one rod and $W_R$ is the outer diameter of the unstressed winding of the at least one rod.

2. An assembly as claimed in claim 1, wherein $$0.3 > \frac{(C+R)-(W_R-R)}{C+R} > 0.2.$$

3. An assembly as claimed in claim 2, wherein $$\frac{(C+R)-(W_R-R)}{C+R}$$

is substantially 0.25.

4. An assembly as claimed in claim 1, wherein the cable comprises a tube for receiving optical fibres, the tube being surrounded by a layer of aramid fibres unimpregnated with hot melt adhesive.

5. An assembly as claimed in claim 1, wherein the assembly further comprises dead end means, the dead end means comprises at least one helically wound rod and is fitted over a portion of the gripping means, and $$\frac{(C+R)-(W_R-R)}{C+R} \geq 1.5 \frac{(C+2R+D)-(W_D-D)}{C+2R+D}$$

where D is the diameter of the at least one rod of the at least one dead end means and $W_D$ is the outer diameter of the unstressed winding of the at least one rod of the dead end means.

6. An assembly as claimed in claim 5, wherein $$\frac{(C+R)-(W_R-R)}{C+R} \geq 2 \frac{(C+2R+D)-(W_D-D)}{C+2R+D}.$$

7. An assembly as claimed in claim 6, wherein $$\frac{(C+R)-(W_R-R)}{C+R} = 0.25$$

and $$\frac{(C+2R+D)-(W_D-D)}{C+2R+D} = 0.075.$$

8. An assembly as claimed in claim 5, wherein the dead end means comprises at least one rod wound in a double helix and looped over part of a support assembly of said cable.

* * * * *

UNITED STATES PATENT AND TRADEMARK OFFICE
CERTIFICATE OF CORRECTION

PATENT NO. : 6,085,008                                          Page 1 of 1
DATED : July 4, 2000
INVENTOR(S) : Sutehall et al.

It is certified that error appears in the above-identified patent and that said Letters Patent is hereby corrected as shown below:

<u>Column 6,</u>
Lines 1-2, after "rod of the", delete "at least one".

Signed and Sealed this

Fourteenth Day of May, 2002

*Attest:*

*Attesting Officer*

JAMES E. ROGAN
*Director of the United States Patent and Trademark Office*